United States Patent [19]

Kawarai et al.

[11] 4,027,823

[45] June 7, 1977

[54] LOADING-UNLOADING APPARATUS FOR A VEHICLE

[75] Inventors: Takashi Kawarai; Yuji Sawada, both of Tokyo; Katsumi Takemoto, Tokyo; Sadao Mikami, Kobe all of Japan

[73] Assignee: Mitsubishi Jukogyo Kabushiki Kaisha, Toyko, Japan

[22] Filed: Oct. 29, 1975

[21] Appl. No.: 627,010

[30] Foreign Application Priority Data

Nov. 18, 1974 Japan ............................ 49-132024

[52] U.S. Cl. ............................ 214/38 CA; 212/25

[51] Int. Cl.$^2$ ........................................ B65G 67/02

[58] Field of Search .... 212/25; 214/38 CA, 16.4 A, 214/701 P

[56] References Cited

UNITED STATES PATENTS

| | | | |
|---|---|---|---|
| 1,507,824 | 9/1924 | Gheen | 212/25 |
| 3,389,814 | 6/1968 | Lemelson | 214/16.4 A |
| 3,841,495 | 10/1974 | Dronick et al. | 214/38 CA |

FOREIGN PATENTS OR APPLICATIONS

| | | | |
|---|---|---|---|
| 2,130,537 | 1/1973 | Germany | 214/38 CA |
| 2,211,931 | 9/1973 | Germany | 214/701 P |

*Primary Examiner*—Robert G. Sheridan
*Attorney, Agent, or Firm*—Cushman, Darby & Cushman

[57] ABSTRACT

An apparatus for loading and unloading a transporter vehicle by which at least half the load is loaded or unloaded at a time comprises a travelling frame which is mounted to be moved by a travel drive device along rails provided on a fixed frame. The travelling frame carries a fork support member, provided with a plurality of lifting forks, which support member can be raised and lowered with respect to the travelling frame by a vertical drive device.

The fork support member has respective projections mounted at its opposite ends which are guided for vertical movement in tilting frames mounted on respective depending portions of the travelling frame. The fork support member can be tilted about an axis transverse to the guide track by actuation of a tilt drive mechanism which drives the tilting frames to pivot the projections. The fork support member can additionally be shifted transversely to the guide track by a shifting device.

2 Claims, 19 Drawing Figures

LOADING-UNLOADING APPARATUS FOR A VEHICLE

The present invention relates to a loading/unloading apparatus for a transporter vehicle, which operates to load and unload the vehicle with articles such as the so-called palletized load, which consists of various types of containers such as corrugated cardboard cases, bags, wooden boxes or plastic containers mounted on a pallet.

Heretofore, fork lift trucks have been used for loading and unloading a vehicle with articles, even where high speed processing results in articles being speedily loaded on trucks coming into a loading/unloading station and thus successively transported out of the station, or on the contrary, where articles are speedily unloaded from vehicles successively arriving at a loading/unloading station. In such operations a great number of fork lift trucks are needed which is uneconomical. In addition, as a result of the fact that a great number of fork lift trucks move around in the loading/unloading station, there is a disadvantage that the station is so confused that transportation of articles are adversely affected.

As one solution for the above-mentioned difficulties, a loader apparatus which automatically achieves loading on a vehicle has been proposed, for example, by U.S. Pat. No. 3,799,377. However, in this loader, upon laterally shifting a fork, it is necessary to shift a large apparatus including not only a fork and a fork support member but also hanging pieces, along rails provided in the lateral direction on a travelling frame, and so the loader becomes a very large-scaled device. Also, a cylinder device for a pitching mechanism is provided in addition to a cylinder device for an elevator mechanism, so that the structure becomes complex. Furthermore, for guiding a fork and a fork support member upon raising or lowering the same, there are provided rails and guide wheels, and in this respect also the complexity is disadvantageous.

According to the present invention there is provided an apparatus for loading or unloading a transporter vehicle comprising a travelling frame mounted to be moved by a travel drive device along a guide track provided on a fixed frame, the travelling frame carrying a fork support member, provided with a plurality of lifting forks, which support member can be raised and lowered with respect to the travelling frame by a vertical drive device, comprising a hydraulic cylinder, which is designed additionally to incline the fork support member with respct to the travelling frame about an axis parallel to the guide track; there being provided respective projections mounted at opposite ends of the fork support member, and tilting frames mounted on respective depending portions of the travelling frame each tilting frame having a guide piece for receiving and guiding a respective one of the projections; the apparatus including a tilt drive mechanism for driving the tilting frames and projections so as to tilt the form support member about an axis transverse to the guide track, and a shifting device for moving the fork support member transversely to the guide track.

When the forks of this apparatus are shifted relative to a transporter vehicle, it is necessary to shift only the fork support member, and thereby shifting device can be simplified. Also, since guiding of the forks and fork support member during raising or lowering the same is achieved by means of the projection pieces provided at the opposite ends of the fork support member and the guide pieces provided on the tilting frames, the vertical guide means for the forks and the fork support member can be simplified. Further, the fork support member can be raised or lowered relative to the tilting frames.

This fork support member is supported in a vertically movable manner by means of the vertical drive device which may be, for example, a device consisting of a pair of wire ropes suspended from the opposite ends of the travelling frame and fixed to the opposite ends of the fork support member and an opposed type of hydraulic cylinder for paying out and taking up the wire ropes. Using this device the fork support member is vertically moved while maintaining its horizontal attitude by paying out or taking up the respective wire ropes by the same length or it is inclined by paying out or taking up the respective wire ropes by different lengths. The two operations of vertical movement and tilting can be achieved by means of a single vertical driving device resulting in a simplified structure.

For a better understanding of the present invention and to show how it may be carried into effect reference will now be made, by way of example, to the accompanying drawings, in which.

Figure 1:
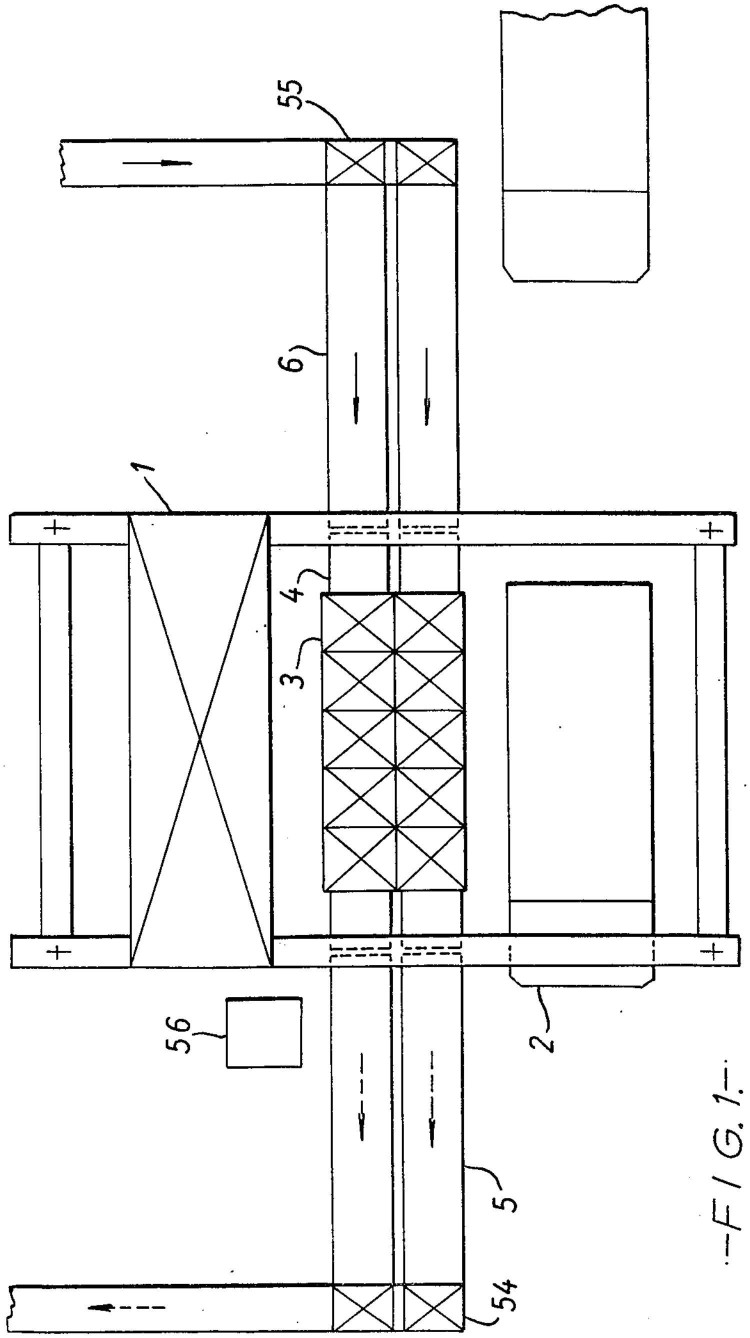
FIG. 1 is a plan view showing the relation between a loading/unloading apparatus for a truck or the like according to the present invention and conveyors and trucks arranged in the neighborhood of the same.

FIG. 1 shows a representative layout of a loading/unloading system including the loading/unloading apparatus according to the present invention. In this figure, reference numeral 1 designates a loading/unloading apparatus according to the present invention, numeral 2 designates a transporter vehicle such as a truck or trailer. A palletized load 3 is carried to and from a loading station by loading/unloading conveyor 4, comprising a postunloading conveyor 5, and a preloading conveyor 6. A palletized load carried in by the vehicle 2 is unloaded all at once onto the loading/unloading conveyor 4 by means of the loading/unloading apparatus 1. Subsequently, when the palletized load 3 is removed in the direction of dotted line arrows by means of the postunloading conveyor 5, another prearranged palletized load (not shown) is fed simultaneously in the direction of solid line arrows by means of the preloading conveyor 6. Then, the fed pelletized load is loaded at once onto the truck 2 by means of the loader/unloader apparatus 1. Thus operation of the loading/unloading apparatus 1 and the conveyors 4 to 6 is coordinated so that unloading and loading work for the truck 2 may be efficiently carried out in succession without moving the truck 2.

Figure 2:
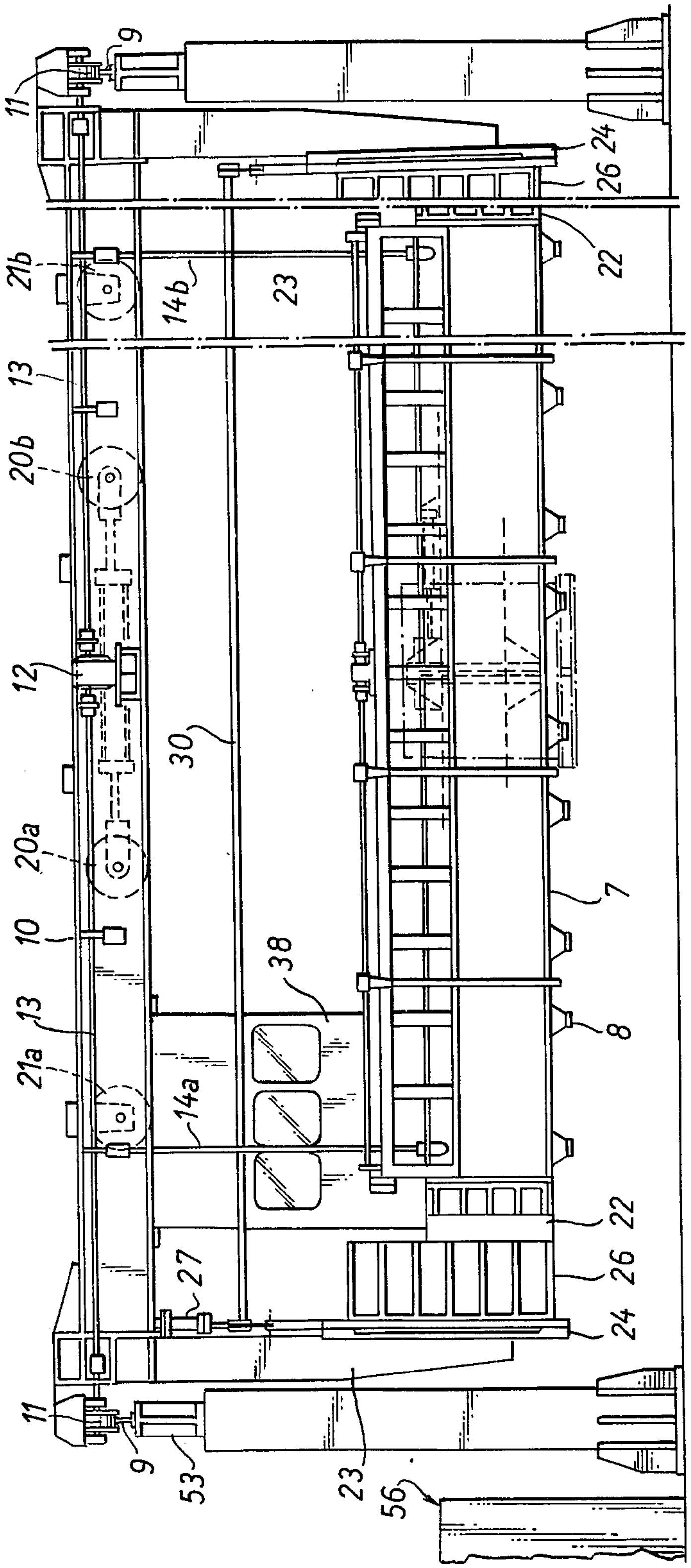
FIG. 2 is a front view showing one preferred embodiment of the loading/unloading apparatus according to the present invention.

Now the loading/unloading apparatus 1 will be described in more detail with reference to one preferred embodiment illustrated in FIGS. 1 to 13. A fork support member 7, carries a plurality of forks 8 mounted thereon so as to project outwardly from the bottom surface of the fork support member 7, for scooping up a palletized load 3. The fork support member 7 is carried by a travelling frame 10 which runs on travelling rails 9 (FIGS. 2 and 3) mounted on fixed frames 53 disposed in the direction perpendicular to the conveying direction of the conveyors 4 to 6. The travelling frame 10 has travelling wheels 11 provided at the opposite ends thereof and is driven along the rails 9 by a travel driving device 12. Numeral 13 designates shafts extending from the travel driving device 12 to one travelling wheel 11 at each end of the travelling frame 10. Thus, the travelling frame 10 is bridged between the rails 9 and travels in a direction perpendicular to that of the conveyors. A driving power of the travel driving device 12 is transmitted to the travelling wheel at each end via the driving shaft 13, so that the travelling frame 10 can travel by itself in the aforementioned direction.

The fork support member 7 is raised and lowered by a vertical drive device comprising wire ropes 14*a*, 14*b*(FIGS. 2 and 4) whose respective upper ends are fixed in opposite side portions of the travelling frame 10 and whose respective lower ends are fixed to opposite ends of the fork support member 7. The vertical drive device also includes the elements represented by reference numerals 15–21 in FIGS. 2, 3 and 4. The vertical drive device thus includes an opposite type of hydraulic cylinder 15, a pair of pistons 19*a*, 19*b* slidably fitted in the cylinder 15, a pair of sheaves 20*a*, 20*b* mounted to the respective pistons 19*a*, 19*b*, and another pair of sheaves 21*a*, 21*b* mounted on the travelling frame 10 outside the sheaves 20*a*, 20*b*. The wire rope 14*a* is fixedly secured to the fork support member 7 via the sheaves 20*a* and 21*a* on the travelling frame 10, and the wire rope 14*b* is fixedly secured to the fork support member 7 via the sheaves 20*b* and 21*b* on the travelling frame. If the pistons 19*a*, 19*b* are made to project by an equal distance by exhausting oil from opposite end ports 16, 17 by an equal amount while supplying pressurized oil to within the hydraulic cylinder 15 through a center port 18 of the cylinder 15 (see FIG. 4), then the wire ropes 14*a*, 14*b* are paid out by the same length, so that the fork support member 7 can be lowered while maintaining its horizontal state. If the pistons 19*a*, 19*b* are made to retract by an equal distance by exhausting oil from the center port 19 while supplying pressurized oil to within the hydraulic cylinder 15 through the opposite end ports 16, 17 by an equal amount, then the wire ropes 14*a*, 14*b* are drawn up by the same length, so that the fork support member 7 can be raised while maintaining its horizontal state. In addition, if the pistons 19*a*, 19*b* are made to project or retract by different distances by making the amount of the exhaust oil through one port 16 of the hydraulic cylinder 15 smaller or larger than the amount of the exhaust oil through the other port 17 upon the aforementioned lowering operation or by making the amount of the supply oil through one port 16 smaller or larger than the amount of the supply oil through the other port 17 upon the aforementioned raising operation, then the wire ropes 14*a*, 14*b* are paid out or drawn up by different lengths, so that the fork support member 7 can be inclined.

The apparatus also includes a tilting device which includes projection pieces 22 mounted on opposite ends respectively of the fork support member 7, hanging pieces 23 which are fixed to opposite ends respectively of the travelling frame 10 and extend downwardly, and a tilting frame 24 rotatably mounted on each respective hanging piece via pivots 25. Each tilting frame 25 has guide pieces 26 disposed thereon to receive a respective one of the pieces 22 slidably fitting therebetween. The tilting device includes a tilting hydraulic cylinder 27 mounted at the left end (as viewed in FIG. 2) of the travelling frame 10, having a piston rod 28 which is coupled to the said one tilting frame 24 (on the left side in FIG. 2) via an arm 29 and a link 31. The other tilting frame 24 is provided with only the arm 29 and the link 31 and is not provided with the hydraulic cylinder. The arms 29, of these two tilting frames 24 are integrally coupled by a connecting shaft 30 so that the driving power of the hydraulic cylinder 27 can be transmitted to the respective tilting frames 24. More particularly, if pressurized oil is supplied to the hydraulic cylinder 27 so as to retract the piston rod 28, then the tilting frames 24, the fork support member 7 and the forks 8 are displacced to the positions indicated by double dot chain lines in FIG. 6 as rotated about the pivot 25. If the piston rod 28 is extended, then the respective members 24, 7, 8 are restored to their respective original positions, and in this way the respective members can be freely tilted up and down about the pivot 25. It is to be noted that the connecting shaft 30 extends at its opposite ends to the proximities of the inner surfaces of the hanging pieces 23, and it is rotatably supported from the travelling frame 10 by means of legs (not shown) hanging from the travelling frame 10 and bearings 30*a* (See FIG. 6) mounted on the legs. It has been already described that the projection pieces 22, provided at the opposite ends of the fork support member 7 are inserted between the guide pieces 26, of the respective tilting frames 24, that the fork support member 7 is supported as suspended by the wire ropes 14*a*, 14*b*, and that the fork support member 7 is associated with a vertical drive device including the elements 15 to 21. Consequently, the fork support member 7 and the forks 8 can be raised and lowered along the guide pieces 26. In the loading/unloading apparatus, the guide means used upon raising or lowering the fork support member 7 employs the system in which the projection piece 22 slides between the guide pieces 26, as described above.

Figure 5:
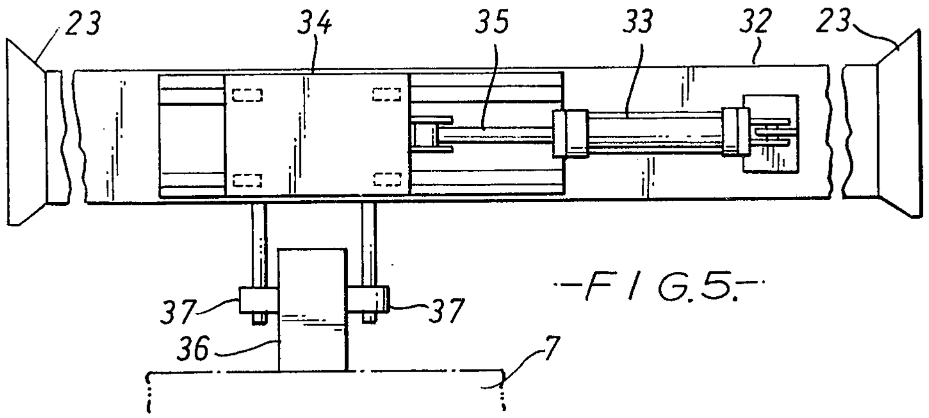
FIG. 5 is a plan view of a shifting cylinder portion which is shown by dotted lines in the upper central portion of FIG. 3.
Figure 6:
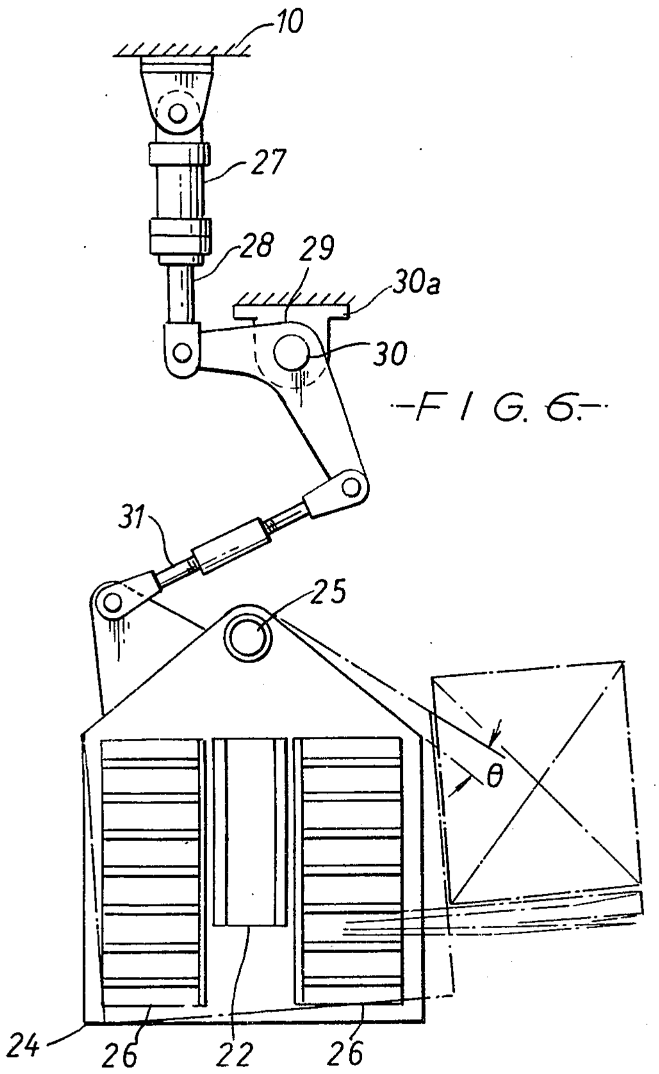
FIG. 6 is a side view of a tilting device portion.
Figure 7:
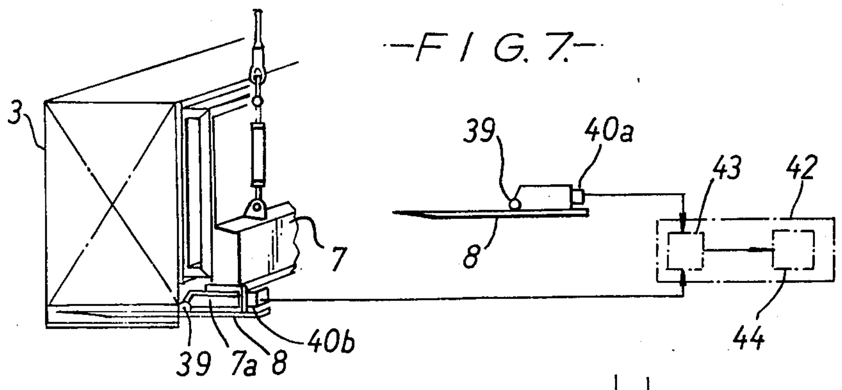
FIG. 7 is a perspective view partly cut away showing a fork loading state detector.
Figure 8:
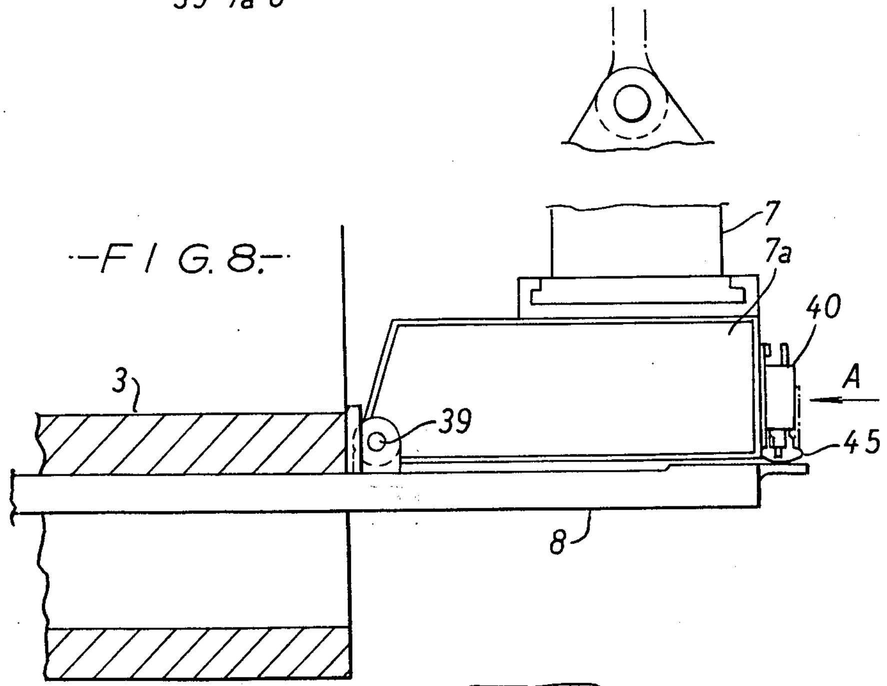
FIG. 8 is an enlarged side view of a part of the detector.
Figure 9:
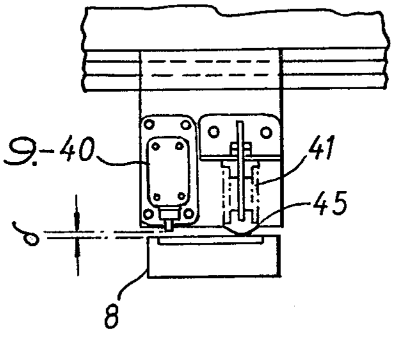
FIG. 9 is a rear view as viewed in the direction of arrow A in FIG. 8.

The fork support member 7 may be shifted transversely between the rails by a shifting hydraulic cylinder 33 mounted securely on a transverly beam 32 (FIG. 5) which in turn is secured at its opposite ends to respective bottoms of the pair of hanging pieces 23 and is bridged across the respective handing pieces 23. A movable member 34 is mounted on the transverse beam 32 so as to be movable in the lengthwise direction of the transverse beam 32 by means of a piston rod 35 of the hydraulic cylinder 33 which is connected to the movable member 34. A vertical movement guide member 36 is mounted on the rear surface of the fork support member 7 extends in the vertical direction and is guided for vertical movement between a pair of guide rollers 37 mounted on said movable member 34. The arrangement is such that if pressurized oil is fed to the hydraulic cylinder 33 so the piston rod 35 projects, the fork support member 7 and the forks 8 are shifted leftwards, while if the piston rod 35 retracts, the members 7 and 8 are shifted rightwards. It is to be noted that the vertical movement guide member 36 has a length matched with the stroke of vertical movement of the fork support member 7 and it is provided on the rear surface of the fork support member 7 as directed in the vertical direction as shown in FIG. 5. An operation chamber 38 (FIG. 2) is provided for controlling the aforementioned respective movable members, which chamber is disposed on the travelling frame 10.

FIGS. 7 to 13 illustrate the relationships between the members 7 and 8 in more detail. Reference numeral 7*a*in FIGS. 7 and 8 designates a bottom part of the fork support member 7 which is integrally mounted on the fork support member 7, and every fork 8 is rotatably supported at the front edge bottom surface of the bottom part 7*a* by means of a pin 39. The fork tip portion in front of this pin 39 is longer than the rear end portion behind the pin 39. Consequently, the rear end portion of the fork 8 always makes contact with the bottom part 7*a*, so that rotation of the fork tip portion in the upward direction only is possible. Among the respective forks 8, only the two forks 8 at the opposite ends are disposed opposite limit switches 40*a*, 40*b* mounted on the rear surface of the bottom part 7*a*. Spring means 41*a* and 41*b* are also mounted on the rear surface of the bottom part 7*a* in a juxtaposition to the limit switches 40*a* and 40*b*, respectively, so that when a palletized load 3 is not loaded on the respective forks 8, the rear end portions of the two forks at the opposite ends are pushed downwards a little by said spring means 41*a*, 41*b* to form a gap clearance $\delta$ between the rear end portions and the limit switches 40*a*, 40*b* and thereby the respective limit switches are turned OFF. When the pelletized load 3 is loaded on the respective forks 8, the rear end portions of the two forks at the opposite ends are pushed back against the resilient forces of the respective spring means 41*a*, 41*b* and thereby the respective limit switches 40*a*, 40*b* are turnd ON, and these states are indicated on a display panel 44 in the operation chamber 38 via a control unit 43 of a loading state detector 42 (See FIG. 7) provided in the operation chamber 38 to show that a pallet is properly loaded. Reference numeral 45 in FIGS. 8 and 9 designates an elastic body mounted at the bottom of the spring means 41*a*, 41*b* so as to strike against the upper surface of the rear end portion of the fork 8, numeral 46 in FIG. 4 designates a pitching display device for indicating the state of pitching at the interior of the operation chamber 38, and numerals 47*a* and 47*b* in FIG. 12 designate detectors for the palletized load, which are mounted on the fork 8.

Figure 3:
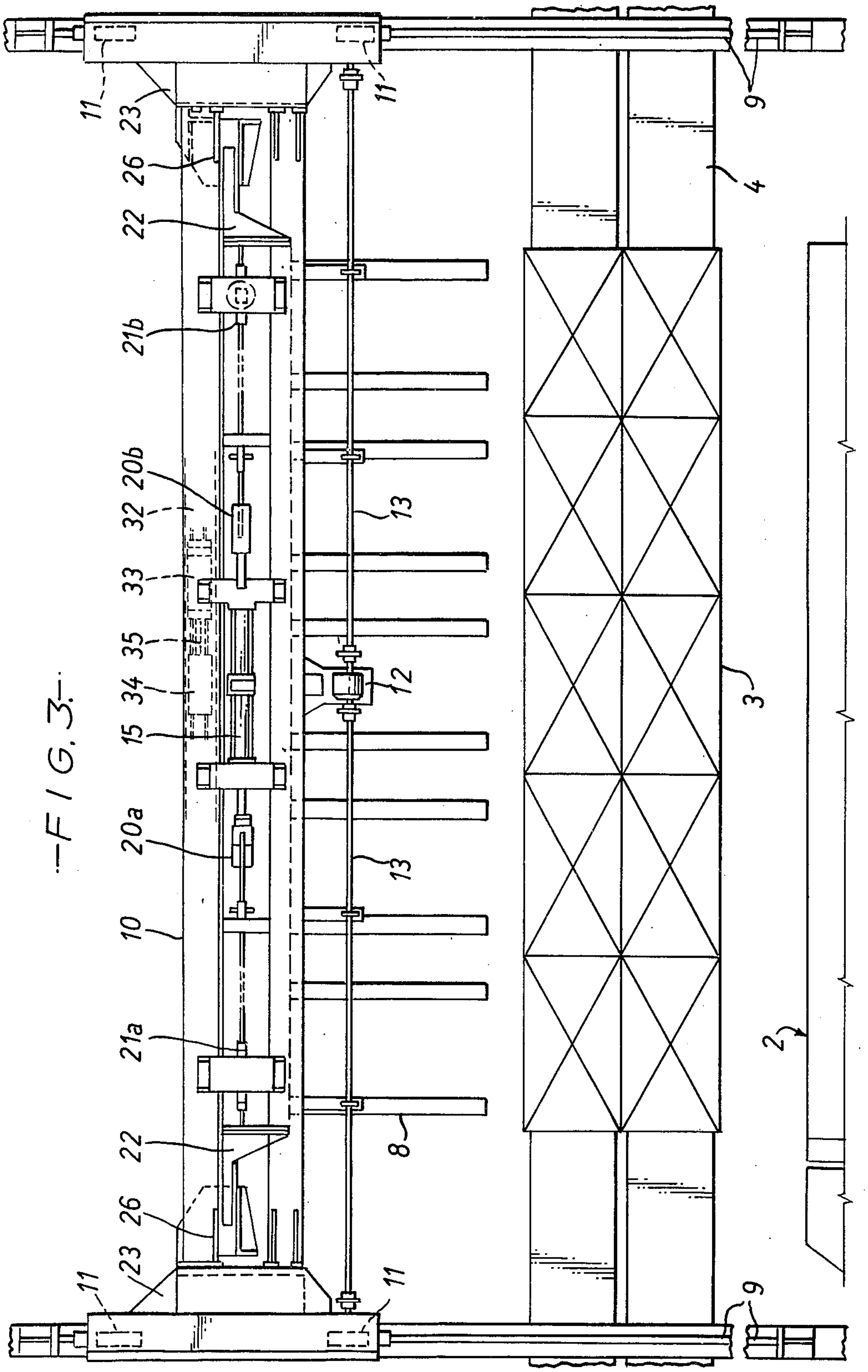
FIG. 3 is a plan view of the apparatus shown in FIG. 2.

Now the operation of the above-described loading-/unloading apparatus will be explained. In order to load the palletized load 3 consisting of 10 arrayed articles as shown in FIG. 3 from the loading/unloading conveyor 4 to the truck 2 all at once, the wire ropes 14*a*, 14*b* are paid by the same length while projecting the pistons 19*a*, 19*b* by an equal distance, by exhausting the oil from the opposite end ports 16, 17 by the same amount while supplying the pressurized oil to the hydraulic cylinder 15 through its center port 18, and thereby the fork support member 7 is lowered to bring the respective forks 8 to the same level as the fork insert portions of the palletized load 3. Subsequently, the travel driving device 12 is driven to advance the travelling frame 10, and thus the respective forks 8 are inerted into the fork insert portions of the palletized load 3. Once the forks have been inserted, the travelling frame 10 is stopped. Then the wire ropes 14*a*, 14*b* are drawn up by the same length while retracting the pistons 19*a*, 19*b* by an equal distance, by exhausting the oil through the center port 18 while supporting the pressurized oil to the hydraulic cylinder 15 through the opposite end ports 16, 17 by the same amount, and thereby the fork support member 7 is raised to support the palletized load 3 with the respective forks 8. Then the palletized load 3 is raised up to a predetermined level.

Figure 4:
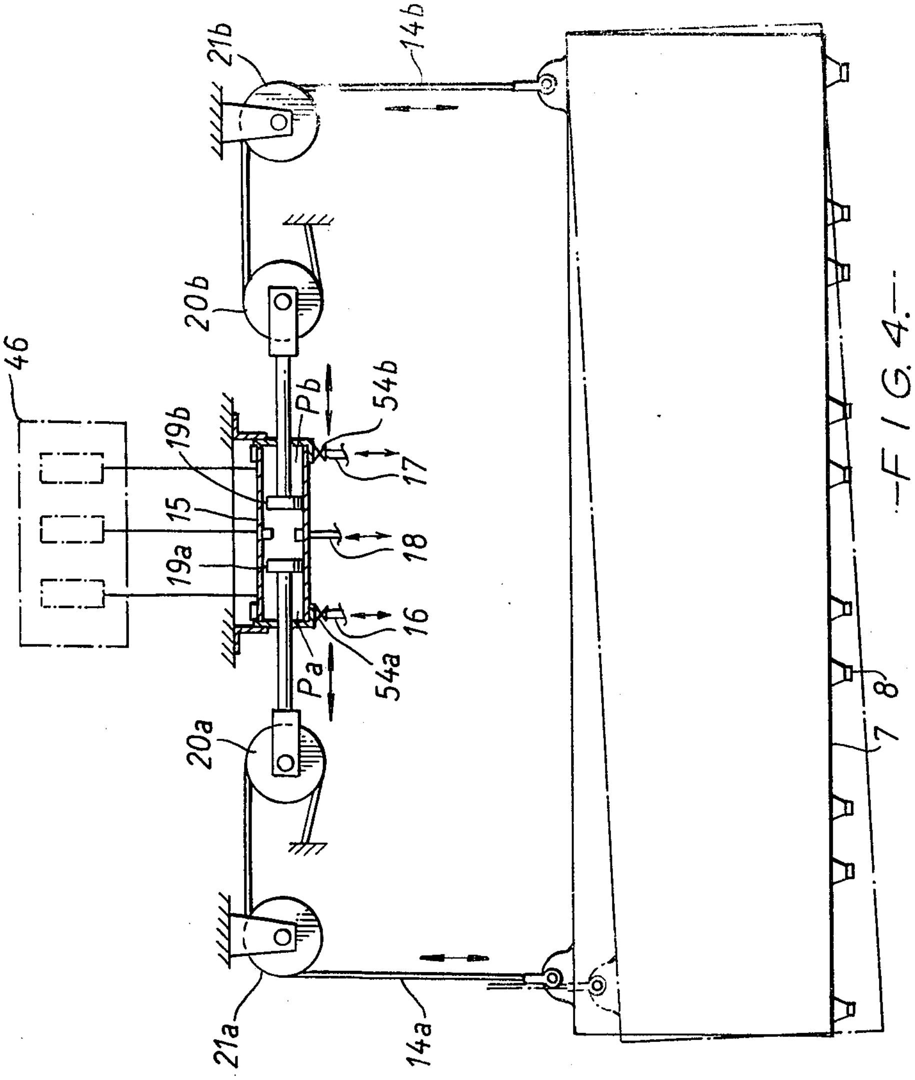
FIG. 4 is a front view partly in longitudinal cross-section of an opposite type of cylinder portion.

Subsequently, the travel driving device 12 is driven to further advance the travelling frame 10. When the palletized load has come right above the loading table of the truck 2, the travelling frame 10 is stopped. Next, the hydraulic cylinder 15 is again actuated in the direction for projecting the pistons to pay out the wire ropes 14*a*, 14*b* by the same length. Thereupon the fork support member 7, the respective forks 8 and the palletized load 3 are lowered and the palletized load is loaded on the loading table of the truck 2. If the loading table of the truck 2 is laterally inclined about the center line of the vehicle body with respect to a horizontal plane, then the entire bottom surface of the palletized load 3 cannot make contact with the floor. In this case, it is brought in contact with the floor by tilting the respective forks 8 by means of the tilting device consisting of the elements 24 to 30. Then since the respective forks 8 become parallel to the loading table and the palletized load 3 loaded thereon, the respective forks 8 can be smoothly extracted from the insert portions of the palletized load 3. This operation is called "tilting operation". Similarly, if the loading table of the truck 2 is included in the longitudinal direction of the truck, also the entire bottom surface of the palletized load 3 cannot make contact with the floor. In this case, one end of the fork support member 7 is raised or lowered with respect to the other end by increasing or decreasing the amount of exhaust oil through one port 16 of the hydraulic cylinder 15 with respect to that through the other port 17. This operation is called "pitching operation". FIG. 4 shows the state where the left end of the fork support member 7 has been lowered with respect to the right end of the same because of the fact that the amount of exhaust oil through the port 16 is larger than that through the port 17. As described, in the loading/unloading apparatus 1, the pitching operation can be achieved without requiring any special device for making the fork support member 7 tilt.

The above explanation has been made in connection to the case where the truck 2 stops at a regular position. If the truck 2 does not stop at the regular position but the loading/unloading conveyor 4 and the loading table of the truck 2 are displaced from each other, then the movable member 34 is displaced along the transverse beam 32 by actuating the shifting cylinder 33, and thereby the fork support member 7 is properly moved until opposite to the loading table of the truck 2. As described above, even if the loading table of the truck 2 is inclined in the lateral or longitudinal direction about a center line of the vehicle body, and even if there exists any error in the stopped position of the truck 2, the fork support member 7 can be tilted or shifted in response thereto, and therefore, the palletized load 3 can be smoothly and reliable (or efficiently) loaded on the truck 2. While description has been made above in connection to loading onto a truck 2, upon unloading it is only necessary to carry out essentially the same operations but with the sequence of operations being reversed.

Figure 10:
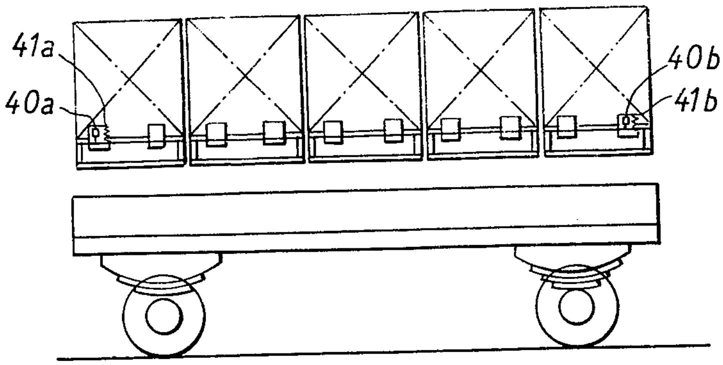
FIGS. 10 and 11 are front views showing the states of loading a palletized load with forks.
Figure 11:
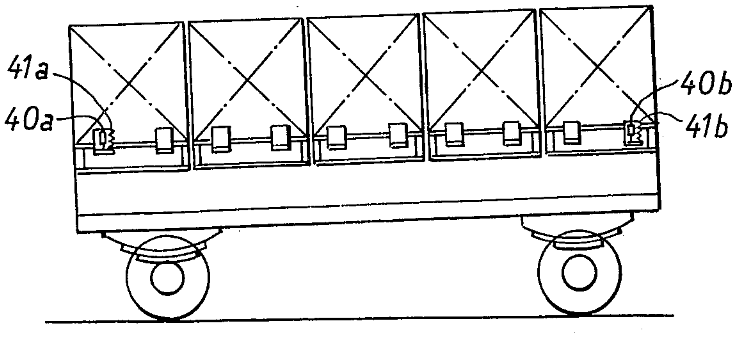
Figure 12:
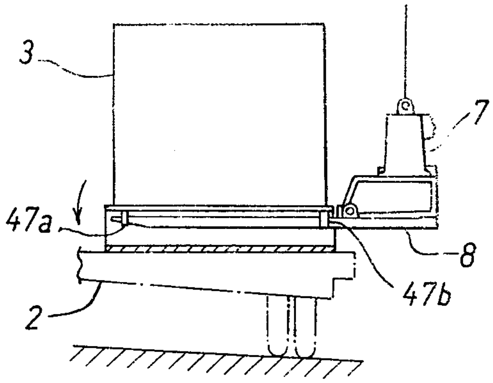
FIGS. 12 and 13 are side views showing the states of detecting a load on the forks and extracting the forks.
Figure 13:
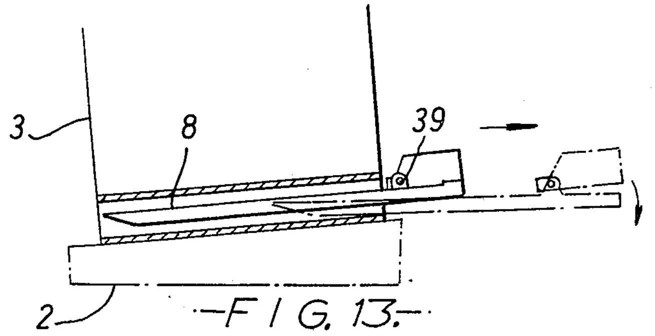

Now description will be made on the operations in the operation chamber 38. When the forks 8 support the palletized load 3, the rear end portions of the two forks 8 at the opposite ends strike against the limit switches 40*a*, 40*b* to turn the respective limit switches ON, so that the loaded state of the palletized load 3 is indicated on the display panel 44 within the operation chamber 38 through the control unit 43. Also, when the palletized load is completely unloaded on the loading table of the truck 2, the forks 8 become a no load condition, so that the limit switches 40*a*, 40*b* are turned OFF. Consequently, the above-described indication on the display panel 44 disappears, so that judgement can be made in the operation chamber 38 that the forks 8 may be extracted. On the other hand, if the loading table of the truck 2 is inclined in the longitudinal direction of the truck, for instance, if the front portion of the loading table of the truck 2 is lower than the rear portion thereof as shown in FIG. 11, then even if it is intended to place the palletized load 3 on the forks 8 onto the loading table by lowering the fork support member 7, it cannot be placed easily as in the regular case as shown in FIG. 10. That is, in the case such as shown in FIG. 11, the right end portion of the palletized load 3 will firstly reach the loading table. As a result, the limit switch 40*b* on one side is turned OFF, and an indication on the display panel 14 corresponding to this limit switch will disappear. Then the left end portion of the palletized load 3 is still in a floating state, so that the other limit switch 40*a* is still ON and an indication on the display panel 14 corresponding to the limit switch 40*a* represents a loaded state. This state can be eliminated by the above-described pitching operation and the same indication is also removed. Then, in the operation chamber 38, and extract operation for the forks 8 is begun. On the other hand, if the loading table of the truck 2 is inclined laterally about a center line of the vehicle body (if the right side is higher) as shown in FIG. 12, when the palletized load 3 is lowered, among the detector 47*a* provided at the tip end of the fork 8 and the detector 47*b* provided at a position nearer to the pin 39, the latter detector 47*b* is disengaged firstly from the insert portion of the palletized load 3. This state is also indicated at the operation chamber 38. In the operation chamber 38, a tilting operation is started, and then the respective detectors 47*a*, 47*b* are disengaged from the aforementioned insert portions. In more particular, the forks 8 are made parallel to the loading table and to said insert portions. In this way, the extraction of the forks 8 is made possible. Where the loading table of the truck 2 is inclined as shown in FIG. 13, when the palletized load 3 is unloaded, the tip end of the fork 8 will rotate upwardly about the pivot pin 39. Therefore, if the fork support member 7 is retracted horizontally at the stage where the palletized load 3 has been completely placed on the loading table, then the forks 8 can be extracted along the bottom surface of the palletized load 3 without being obstructed.

Figure 14:
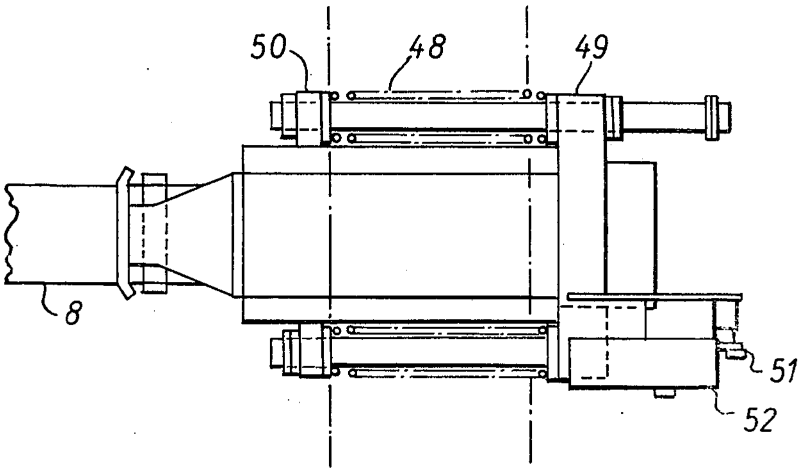
FIG. 14 is a plan view showing a safety device for a fork.
Figure 15:
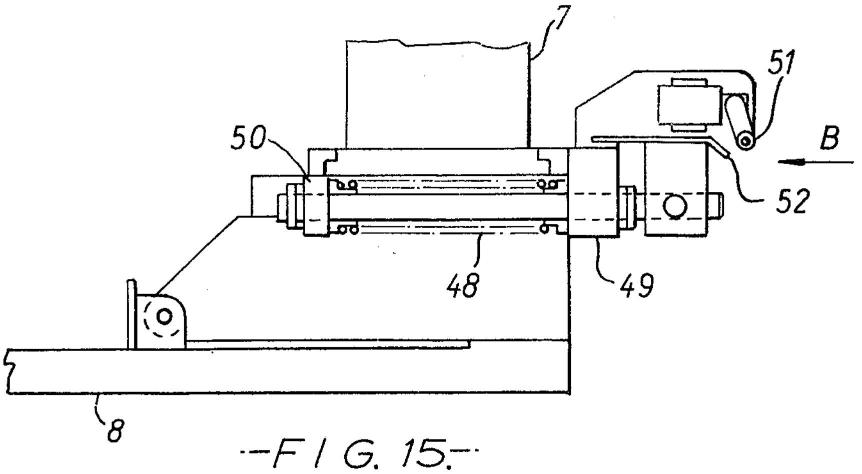
FIG. 15 is a front view of the safety device of FIG. 14.
Figure 16:
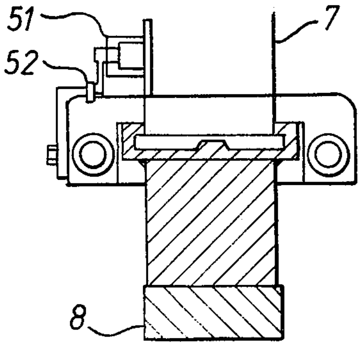
FIG. 16 is a rear view as viewed in the direction of arrow B in FIG. 15.

FIGS. 14 to 16 show another embodiment of the apparatus which is a modification of the apparatus of FIGS. 1 to 13. Upon inserting the forks 8 into the fork insert portions of the palletized load 3, unless these portions align with each other, the forks 8 will strike against the palletized load 3 and push out the same. This modified embodiment has been worked out to avoid such difficulties. According to this embodiment, if the tip end of any one fork 8 among the large number of forks 8 interferes with the palletized load 3, then the insert operation is stopped as controlled by a detector as described hereinunder, the positions of the forks 8 are corrected, and subsequently the insert operation is carried out. Explaining this modified embodiment in more detail, each fork 8 is mounted so as to be slidable in the forward and backward directions with respect to the fork support member 7 as shown in FIG. 16. In FIGS. 14 and 15, reference numeral 48 designates springs interposed between a protrusion member 49 provided on the fork support member 7 and another protrusion member 50 provided on each fork 8, numeral 51 designates a limit switch fixedly secured to the fork support member 7, and numeral 52 designates a detector metal piece fixedly secured to the fork 8, that is, a detector metal piece which strikes against the limit switch 51 in response to the movement of the fork 8 for actuating the same limit switch.

Now the operation of the aforementioned modified embodiment will be described. If the tip end of any one fork 8 strikes against the palletized load 3, then only the fork support member 7 advances against the resilient force of the springs 48 until the limit switch 51 strikes against the detector metal piece 52, when the limit switch 51 is actuated. When the limit switch 51 is actuated, the travel driving device 12 which has been driven up to that time, will be stopped. Subsequently, the position of the fork support member 7 is corrected and insertion of the forks 8 is carried out. It is to be noted that during the insert operation the forks 8 are automatically pushed out by the springs 48. As described, according to the embodiment of the invention, when the forks 8 and the palletized load 3 are staggered in position from each other, also the travel driving device is automatically stopped. Since the position of the fork support member 7 is subsequently corrected and then insertion of the forks 8 is carried out, the risk that the forks 8 may advance regardless of the staggered relative positions and push and fall the palletized load 3, can be preliminarily avoided.

It is to be noted that the operation chamber 38 is provided on the travelling frame 10 so as to be moved jointly with the travelling frame 10. Such provision is made for the purpose of enabling an operator in the operation chamber 38 to confirm the boundary between the front portion and the loading table of the truck, and owing to such provision the boundary can be more readily confirmed than in the case of mounting the operation chamber 38 on the fixed frame 53 so as not to be movable. The access of this operation chamber 38 is carried out as by a ladder (not shown) or the like. Similarly, to the embodiment shown in FIG. 4, if pressurized oil is supplied through the opposite end ports 16, 17 and the oil is exhausted through the center port 18, then the fork support member 7 is raised. At this time, if the pressure P*a* or P*b* on the pressurized oil side of the hydraulic cylinder 15 should be reduced lower than a predetermined pressure as by any accident, then the fork support member 7 would fall down. In order to prevent such a fault, provision is made such that the pressures P*a* and P*b* are detected and when either one of these pressures becomes lower than a predetermined pressure, the automatic control valve 54*a* and 54*b* are closed to prevent reverse flows through the ports 16 and 17, and thereby falling of the fork support member 7 can be prevented. In addition, for the purpose of supplying pressurized oil to the respective cylinders 15, 27 and 33, a pressurized oil unit 56 (See FIG. 2) is equipped in the proximity of the loading/unloading apparatus 1 and the pressurized oil is supplied from this unit to the respective cylinders. Also, the exhaust oil is collected in this unit. In this way, if the supply and collection of the oil is centralized, then the pipings would become simpler and the controls and operations are facilitated. It is a matter of course that providing a single pressurized oil unit is economically advantageous.

In addition, if the arrangement shown in FIG. 1, is employed, the palletized load 3 carried in by means of the truck 2 can be unloaded as a whole and at the same time onto the loading/unloading conveyor 4 by means of the loading/unloading apparatus 1. Subsequently, in coincidence with the delivery of the palletized load 3 onto the postunloading conveyor 5, another palletized load 3 which has been arranged on the preloading conveyor 6 is fed from the preloading conveyor 6 to the loading/unloading conveyor 4, and then said another palletized load 3 can be loaded as a whole and at the same time onto the truck 2 by means of the loading/unloading apparatus 1. Here it is to be noted that the postunloading conveyor 5 is adapted to accommodate a palletized load 3 of the amount equal to a capacity of one truck. Also, the postunloading conveyor 5 and the loading/unloading conveyor 4 are adapted to be moved at the same speed simultaneously. Consequently, the palletized load 3 can be delivered in one operation to the postunloading conveyor 5. This palletized load 3 on the postunloading conveyor 5 could be delivered slowly through a converter 54 by the time when the next palletized load 3 is supplied. Similarly, the preloading conveyor 6 is adapted to accommodate a palletized load 3 of the amount equal to a capacity of one truck. In other words, by providing conveyors, each of which can accommodate a palletized load 3 ofthe amount equal to a capacity of one truck, before and behind the loading/unloading apparatus 1, delivery from the loading/unloading conveyor 4 and supply to the same conveyor 4 can be carried out speedily, and thereby the service time can be shortened. If these conveyors cannot accommodate a palletized load 3 of the amount equal to a capacity of one truck, then obviously the cycle time will be prolonged due to the capability of the converters 54, 55.

While the present invention has been described above in connection to a loading/unloading apparatus which can be used for loading as well as for unloading, the same apparatus, of course, can be used as an apparatus for loading only or as an apparatus for unloading only depending upon the desired use.

Figure 17:
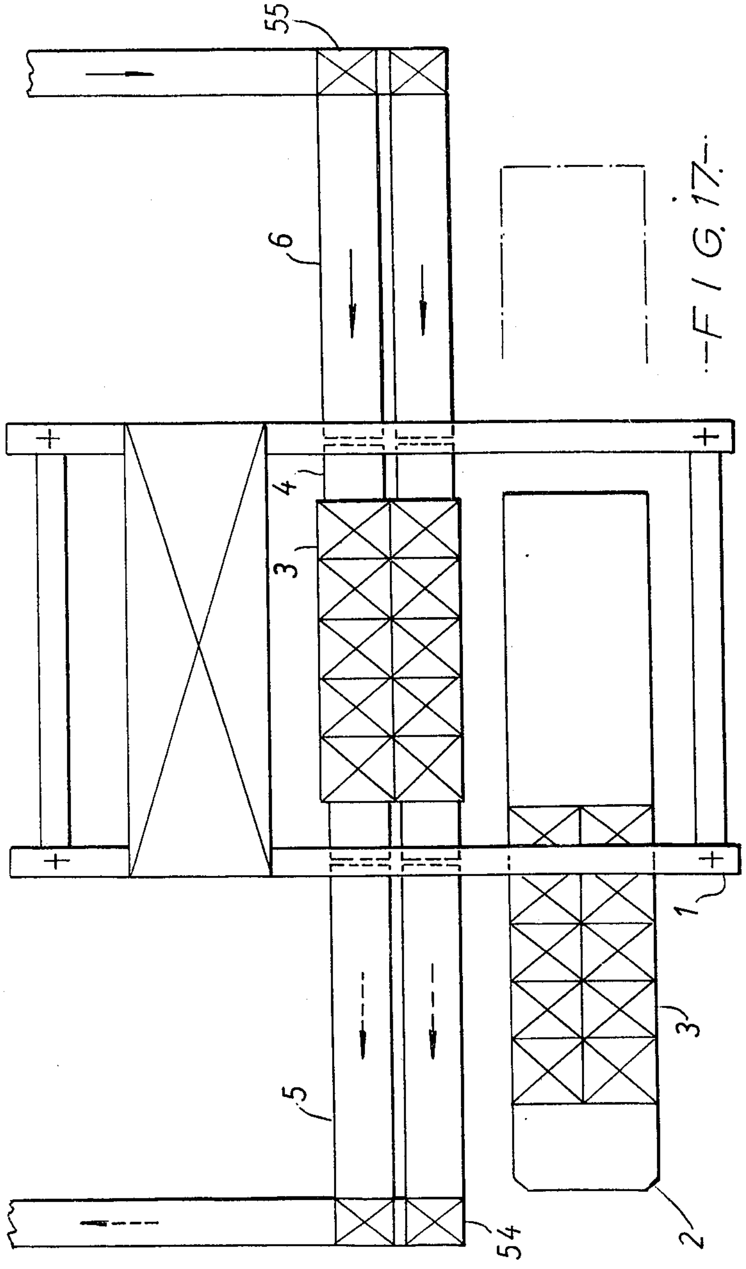
FIG. 17 is a plan view showing an example of a loading/unloading system in case that a loading capacity of a truck is large.
Figure 18:
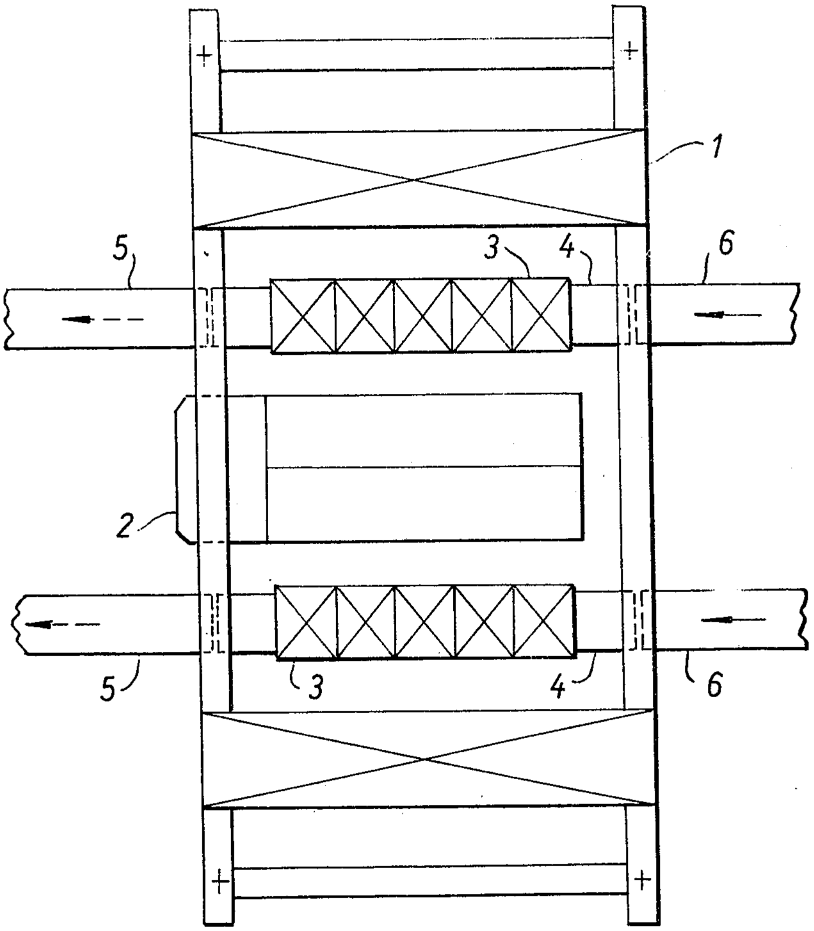
FIG. 18 is a plan view showing another embodiment of the present invention in which loading-unloading apparatuses and conveyors are provided on the both sides of a truck position.

FIG. 17 shows an alternative embodiment for loading or unloading on a truck having a larger loading capacity such as, for example, a truck having twice as large capacity as the truck 2 in FIG. 1. In this embodiment, the sequence of operations is as follows:

I. A truck is allowed to enter and stop there. Subsequently unloading is carried out from the rear portion of the truck.

II. The truck is moved back by a length substantially equal to one-half of the length of the loading table, and then is stopped. Subsequently, unloading is carried out from the front portion of the truck.

III. Loading is carried out onto the front portion of the truck without moving the same.

IV. The truck is advanced to the position upon the Operation (I) above and then is stopped there. Subsequently, loading is carried out onto the rear portion of the truck, and thus the loading and unloading have been completed.

Figure 19:
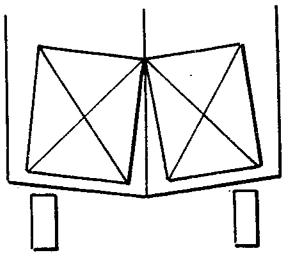
FIG. 19 is a diagrammatic view showing a truck having a largely inclined loading table.

If it is desired to load a loading table of a truck from its both sides simultaneously or if it is desired to unload the same to its both sides, then it is only required that the conveyor lines are provided on both sides of the truck stop position and that the loading/unloading apparatuses 1 are disposed outside of the respective conveyor lines. Although the apparatus becomes more complex in structure and more expensive in cost in comparison to the system for loading from one side and unloading to one side, this modified system is favourable where the truck 2 is provided with a partition plate along its center line. While a truck has been described above as a conveying vehicle for a palletized load 3, the present invention is applicable to any type of vehicle so long as it is a vehicle capable of conveying a palletized load 3. In addition, while description has been made above on a travelling device, pitching and lifting device, shifting device and tilting device which can be actuated by pressurized oil, a part of these devices, of course, could be actuated by means of electric motors. In addition, if the apparatus is modified in such manner that the individual forks may be inserted and extracted to and from the fork support member by means of a screw-nut mechanism (not shown), then the apparatus is effective for loading and unloading where the loading table of the truck is largely inclined as shown in FIG. 19. That is, the fork support member and the forks are tilted through the tilting operation. Then the forks are advanced or retracted by means of the aforementioned mechanism and thereby loading or unloading can be carried out. The above-described wire ropes 14*a*, 14*b* could be replaced by chains or the like without any disadvantage.

While the present invention has been described above in connection to its preferred embodiments, it is a matter of course that the invention should not be limited to the illustrated embodiments but various changes in design could be made without departing from the spirit of the invention.

What we claim is:

1. An apparatus for loading or unloading a transporter vehicle, comprising:

a travelling frame mounted to be moved by a travel drive device along a guide track provided on a fixed frame;

the travelling frame carrying a fork support member provided with a plurality of lifting forks, which support member can be raised and lowered with respect to the travelling frame by a vertical drive device;

said vertical drive device comprising a hydraulic cylinder, which is designed additionally to incline the fork support member with respect to the travelling frame about an axis parallel to the guide track;

there being provided respective projections mounted at opposite ends of the fork support member;

and tilting frames mounted on respective depending portions of the travelling frame;

each tilting frame having a guide piece for receiving and guiding a respective one of the projections;

a tilt drive mechanism for driving the tilting frames and projections so as to tilt the fork support member about an axis transverse to the guide track;

a shifting device for moving the fork support member transversely to the guide track;

said vertical drive device being operable to lower the forks and the fork support member while maintaining them in a horizontal state by exhausting oil from two end ports disposed on opposite sides of two pistons of the hydraulic cylinder by an equal amount while supplying pressurized oil to within the hydraulic cylinder through a center port of said hydraulic cylinder to project the both pistons by an equal distance, or on the contrary, to raise the forks and the fork support member while maintaining them in a horizontal state by exhausting oil from the center port of said hydraulic cylinder while supplying pressurized oil to within the hydraulic cylinder through the both end ports of said hydraulic cylinder to retract the both pistons by an equal distance; and said vertical drive device being operable to lower one end of said fork support member to a greater extent than the other end thereof, that is, to incline the support member by making the amount of oil exhausted from one end port of said hydraulic cylinder larger than the amount of oil exhausted from the other end port thereof;

the shifting device comprising a hydraulic cylinder mounted on a transverse beam disposed between the depending positions of the travelling frame; the latter hydraulic cylinder being operable to shift a movable member;

the fork support member having a vertical movement guide member which engages with the movable member in such a way that it is movable vertically independently of such movable member but is constrained to move transversely with such movable member.

2. An apparatus according to claim 1 wherein the lifting forks are pivotally mounted on the fork support member with a lifting end one side of the pivot and a support end the other side of the pivot, the support end being engageable with a bottom part of the support member when a load is being supported by the forks, there being provided sensing means associated with the extreme outer forks for sensing when a load is being supported and biassing means for biassing the outer forks away from the said bottom part to prevent the sensing means being accidentally actuated.

* * * * *